(12) United States Patent
Onishi et al.

(10) Patent No.: US 12,407,370 B2
(45) Date of Patent: Sep. 2, 2025

(54) FREQUENCY BAND DETERMINATION BASED ON IMAGE OF COMMUNICATION ENVIRONMENT FOR HEAD-MOUNTED DISPLAY

(71) Applicant: Sony Interactive Entertainment Inc., Tokyo (JP)

(72) Inventors: Katsuyoshi Onishi, Tokyo (JP); Yoshio Miyazaki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/535,284

(22) Filed: Dec. 11, 2023

(65) Prior Publication Data
US 2024/0106479 A1    Mar. 28, 2024

Related U.S. Application Data

(63) Continuation of application No. 17/965,097, filed on Oct. 13, 2022, now Pat. No. 11,881,886, which is a
(Continued)

(51) Int. Cl.
*H04B 1/38* (2015.01)
*G06F 3/01* (2006.01)
(Continued)

(52) U.S. Cl.
CPC ........... *H04B 1/3827* (2013.01); *G06F 3/011* (2013.01); *G06V 20/00* (2022.01); *H04W 72/02* (2013.01); *H04W 72/0453* (2013.01)

(58) Field of Classification Search
CPC ...... H04B 1/3827; H04B 1/385; H04B 1/005; H04B 2001/3866; G06F 3/011;
(Continued)

(56) References Cited

U.S. PATENT DOCUMENTS

| 5,184,250 A | 2/1993 | Lacroix |
| 7,171,233 B2 | 1/2007 | Sanchez |

(Continued)

FOREIGN PATENT DOCUMENTS

| CA | 2043643 A1 | 12/1991 |
| CN | 1481193 A | 3/2004 |

(Continued)

OTHER PUBLICATIONS

International Search Report for corresponding PCT Application No. PCT/JP2016/087749, 2 pages, dated Mar. 7, 2017.

(Continued)

*Primary Examiner* — Md K Talukder
(74) *Attorney, Agent, or Firm* — Kilpatrick Townsend & Stockton LLP

(57) ABSTRACT

Methods and apparatus provide for a head-mounted display to be worn by a user located within a physical environment and for engaging in an interactive experience; an entertainment device including a processing section that executes an interactive application that is manipulated in part through receiving inputs from the user; a communication partner operating to relay video and audio signals outputted from the entertainment device to the head-mounted display; continuously acquiring information of the environment at a predetermined frame rate; at least one camera on the head-mounted display, which captures images of the physical environment, where the communication partner is connected to the entertainment device with wired communication, and the communication partner is connected to the head-mounted display with wireless communication.

14 Claims, 7 Drawing Sheets

Related U.S. Application Data continuation of application No. 17/224,470, filed on Apr. 7, 2021, now Pat. No. 11,528,706, which is a continuation of application No. 16/903,682, filed on Jun. 17, 2020, now Pat. No. 10,999,847, which is a continuation of application No. 15/776,242, filed as application No. PCT/JP2016/087749 on Dec. 19, 2016, now Pat. No. 10,721,735.

(51) Int. Cl.
*G06V 20/00* (2022.01)
*H04B 1/3827* (2015.01)
*H04W 72/02* (2009.01)
*H04W 72/0453* (2023.01)

(58) Field of Classification Search
CPC .. G06V 20/00; H04W 72/02; H04W 72/0453; G02B 27/017
See application file for complete search history.

(56) References Cited

U.S. PATENT DOCUMENTS

| | | | |
|---|---|---|---|
| 8,013,929 B2 | 9/2011 | Sudo | |
| 8,818,273 B2* | 8/2014 | Jung | H04B 1/02 455/41.2 |
| 8,982,799 B2* | 3/2015 | Yuk | H04W 72/23 455/434 |
| 9,047,698 B2 | 6/2015 | Maciocci | |
| 9,344,645 B2 | 5/2016 | Murayama | |
| 9,372,345 B2 | 6/2016 | Fujimaki | |
| 9,599,818 B2 | 3/2017 | Yamagishi | |
| 9,766,715 B2 | 9/2017 | Fuimaki et al. | |
| 10,069,186 B2 | 9/2018 | Li | |
| 10,108,018 B2 | 10/2018 | Takahashi | |
| 10,230,938 B2 | 3/2019 | Kura | |
| 10,379,362 B2* | 8/2019 | Baek | G06F 1/163 |
| 10,405,195 B2 | 9/2019 | Lotter | |
| 10,721,735 B2 | 7/2020 | Onishi | |
| 2004/0110531 A1* | 6/2004 | Sanchez | H04W 48/18 455/553.1 |
| 2004/0143428 A1 | 7/2004 | Rappaport | |
| 2004/0215769 A1 | 10/2004 | Yoshida | |
| 2009/0009652 A1 | 1/2009 | Sudo | |
| 2009/0033588 A1* | 2/2009 | Kajita | G02B 27/0172 345/2.3 |
| 2010/0060714 A1 | 3/2010 | Kang | |
| 2011/0035191 A1 | 2/2011 | Roh | |
| 2011/0249132 A1 | 10/2011 | Murayama | |
| 2012/0188345 A1 | 7/2012 | Salow | |
| 2012/0249416 A1 | 10/2012 | Maciocci | |
| 2013/0147686 A1* | 6/2013 | Clavin | G02B 27/017 345/8 |
| 2013/0235081 A1* | 9/2013 | Ishibashi | G09G 5/377 345/638 |
| 2013/0257690 A1 | 10/2013 | Fujimaki | |
| 2013/0336631 A1 | 12/2013 | Kura | |
| 2014/0022793 A1 | 1/2014 | Apte | |
| 2014/0064199 A1* | 3/2014 | Pan | H04W 72/02 370/329 |
| 2014/0125575 A1* | 5/2014 | Samanta Singhar | G06F 3/038 345/156 |
| 2014/0184724 A1 | 7/2014 | Cho | |
| 2014/0205205 A1 | 7/2014 | Neubauer | |
| 2014/0349577 A1* | 11/2014 | Matsuda | H04W 4/80 455/41.2 |
| 2015/0016246 A1 | 1/2015 | Morita | |
| 2015/0080043 A1* | 3/2015 | Wang | H04W 48/16 455/509 |
| 2015/0081837 A1* | 3/2015 | Bernier | H04W 4/80 709/217 |
| 2015/0094142 A1 | 4/2015 | Roger | |
| 2015/0116316 A1 | 4/2015 | Fitzgerald | |
| 2015/0181602 A1 | 6/2015 | Liu | |
| 2015/0293362 A1 | 10/2015 | Takahashi | |
| 2015/0317518 A1 | 11/2015 | Takano | |
| 2016/0012612 A1* | 1/2016 | Koga | G09G 5/397 345/633 |
| 2016/0227535 A1* | 8/2016 | Sharma | H04W 72/1215 |
| 2017/0308258 A1* | 10/2017 | Xu | G06F 13/14 |
| 2018/0288672 A1* | 10/2018 | Sai | H04W 4/40 |
| 2018/0357980 A1* | 12/2018 | Miyazaki | G09G 5/12 |
| 2019/0021090 A1* | 1/2019 | Do | H04N 21/44227 |
| 2024/0106479 A1* | 3/2024 | Onishi | H04W 72/0453 |

FOREIGN PATENT DOCUMENTS

| | | |
|---|---|---|
| CN | 1540880 A | 10/2004 |
| CN | 200962647 Y | 10/2007 |
| CN | 101340522 A | 1/2009 |
| CN | 101601210 A | 12/2009 |
| CN | 102215327 A | 10/2011 |
| CN | 202002978 U | 10/2011 |
| CN | 103416072 A | 11/2013 |
| CN | 103460255 A | 12/2013 |
| CN | 103480154 A | 1/2014 |
| CN | 104471428 A | 3/2015 |
| CN | 104781873 A | 7/2015 |
| CN | 105045375 A | 11/2015 |
| EP | 2166749 A2 | 3/2010 |
| EP | 2375726 A1 | 10/2011 |
| EP | 3057301 A1 | 8/2016 |
| GB | 2517263 A | 2/2015 |
| JP | 2006332970 A | 12/2006 |
| JP | 2007267578 A | 10/2007 |
| JP | 2008070332 A | 3/2008 |
| JP | 2010114774 A | 5/2010 |
| JP | 2010136263 A | 6/2010 |
| JP | 2012186659 A | 9/2012 |
| JP | 2012186701 A | 9/2012 |
| JP | 2013051570 A | 3/2013 |
| JP | 2013093664 A | 5/2013 |
| JP | 2013205920 A | 10/2013 |
| JP | 2013236213 A | 11/2013 |
| JP | 2014179682 A | 9/2014 |
| JP | 2015149654 A | 8/2015 |
| JP | 2015213212 A | 11/2015 |
| JP | 2015228097 A | 12/2015 |
| WO | 2015036691 A1 | 3/2015 |
| WO | 2015118733 A1 | 8/2015 |

OTHER PUBLICATIONS

International Preliminary Report on Patentability and Written Opinion for corresponding PCT Application No. PCT/JP2016/087749, 6 pages, dated Jul. 5, 2018.
Extended European Search Report for corresponding EP Application No. 16878620.0, 8 pages, dated Oct. 12, 2018.
Notification of Reasons for Refusal for corresponding JP Application No. 2018-192501, 13 pages, dated Aug. 20, 2019.
First Office Action for corresponding CN Application No. 201680074014.5, 12 pages, dated Oct. 23, 2019.
Notification for reason for refusal for corresponding JP Application No. 2018192501, 13 pages, dated Mar. 3, 2020.
The First Office Action for corresponding CN Application No. 202010728036.7, 17 pages, dated Jul. 9, 2021.
Office Action for corresponding CN Application No. 202010728036.7, 17 pages, dated Feb. 25, 2022.
Jiasong Liu, "Using front series method to receive microwave TV signal skillfully" China National Cable TV, Issue 09, 3 pages, Sep. 30, 1996 (See Non-Patent Literature #1 for relevancy and English translation).
Ning Cai, "The characteristics and development of digital microwave communication superior to optical fiber", China New Technology and New Products, Issue 03, 8 pages, Feb. 10, 2015 (See Non-Patent Literature #1 for relevancy and English translation).
Office Action for corresponding CN Application No. 2022091402497080, 21 pages, dated Sep. 19, 2022.

(56) References Cited

OTHER PUBLICATIONS

Notice of Allowance for corresponding CN Application No. 202010728036.7, 9 pages, dated Dec. 23, 2022.

\* cited by examiner

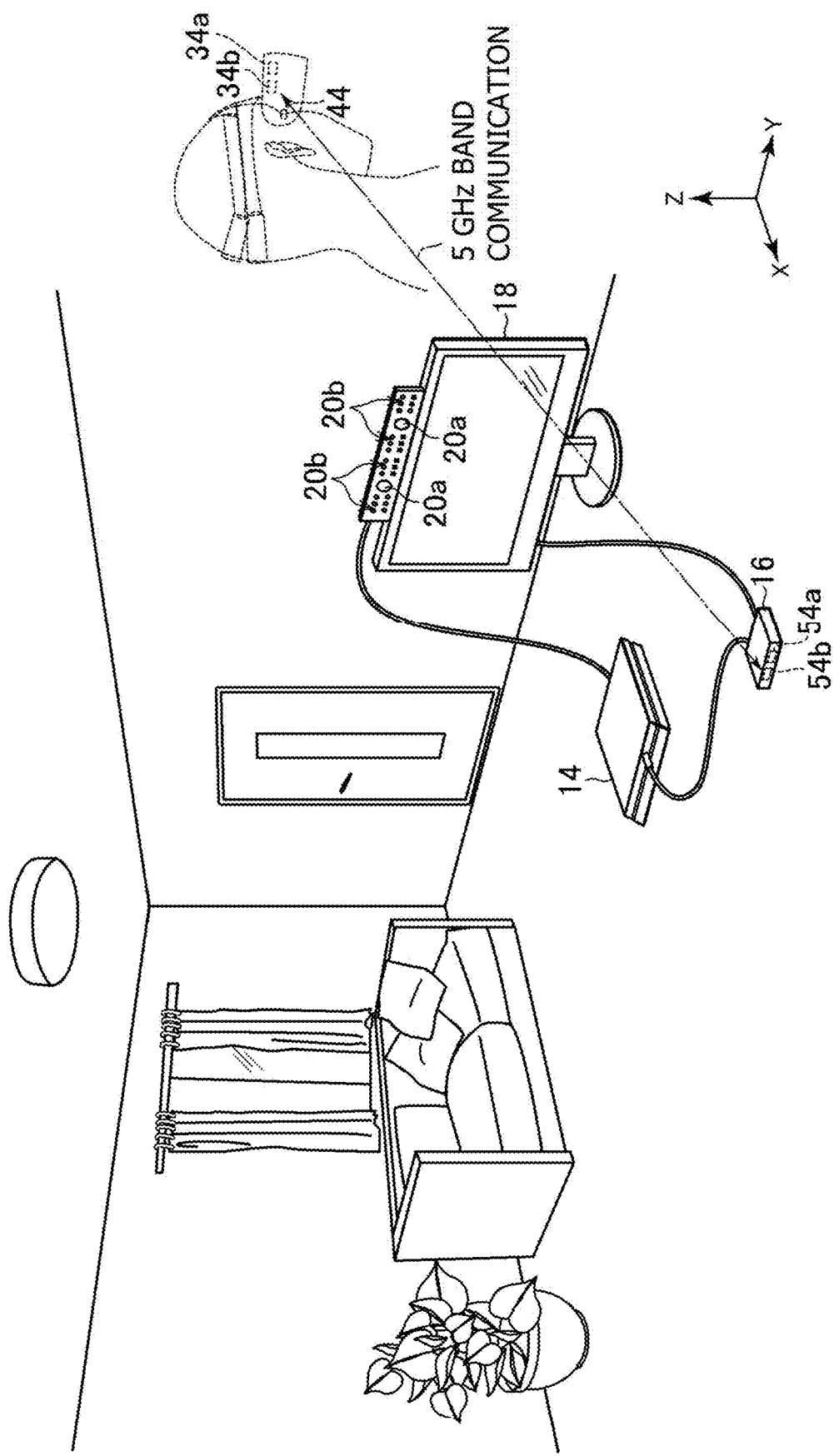

FREQUENCY BAND DETERMINATION BASED ON IMAGE OF COMMUNICATION ENVIRONMENT FOR HEAD-MOUNTED DISPLAY

CROSS REFERENCE TO RELATED APPLICATIONS

This is a continuation application of U.S. patent application Ser. No. 17/965,097, accorded a filing date of Oct. 13, 2022, (allowed); which is a continuation of U.S. patent application Ser. No. 17/224,470, accorded a filing date of Apr. 7, 2021, (U.S. Pat. No. 11,528,706, issued on Dec. 13, 2022); which is a continuation application of U.S. patent application Ser. No. 16/903,682, accorded a filing date of Jun. 17, 2020 (U.S. Pat. No. 10,999,847 issued on May 4, 2021); which is a continuation application of U.S. patent application Ser. No. 15/776,242, accorded a filing date of May 15, 2018 (U.S. Pat. No. 10,721,735 issued on Jul. 21, 2020); which is a national stage application of International Application No. PCT/JP2016/087749, filed Dec. 19, 2016; which claims priority to JP Application No. 2015-251360, filed Dec. 24, 2015, the entire disclosures of which are hereby incorporated by reference.

TECHNICAL FIELD

The present invention relates to a frequency band determination device, a head-mounted display, a frequency band determination method, and a program.

BACKGROUND ART

There is a known technology for monitoring radio wave conditions for wireless communication and changing a frequency band used for communication in accordance with the monitored radio wave conditions.

SUMMARY

Technical Problem

Millimeter waves, for example, in a 60 GHz band are highly linear. Thus, the communication quality of such millimeter waves significantly varies depending on an environment in which a communication device and a communication partner are placed, namely, for example, depending on whether an obstacle exists in a communication path or the communication device and the communication partner are in the same room. It is therefore preferable that the frequency band used for communication be changed as soon as possible in accordance with a change in the environment in which the communication device and the communication partner are placed.

If, for example, the radio waves used for communication by the communication device are changed to 5 GHz band or other microwaves in a situation where the communication quality degrades while the communication device uses millimeter waves for communication, the communication quality may improve because the microwaves are more diffractive than the millimeter waves. Therefore, if the communication quality is lowered while millimeter waves are used for communication, it is preferable that the radio waves used for communication by the communication device be changed to microwaves as soon as possible.

Consequently, when the communication quality of millimeter-wave communication is monitored and found to be degraded, it is conceivable that an attempt is made to change the radio waves for communication by the communication device to microwaves. However, if such an approach is used, a certain period of time elapses between the instant at which an environmental change occurs to degrade the communication quality and the instant at which the radio waves used for communication by the communication device are changed to microwaves.

The present invention has been made in view of the above circumstances. An object of the present invention is to provide a frequency band determination device, a head-mounted display, a frequency band determination method, and a program that are capable of unprecedentedly quickly changing the frequency band used for communication in accordance with a change in the environment in which the communication device and the communication partner are placed.

Solution to Problem

In order to solve the above problem, a frequency band determination device according to the present invention includes an image acquisition section and a frequency band determination section. The image acquisition section acquires an image of an environment in which at least either a communication device or a communication partner for the communication device is placed. The frequency band determination section determines, based on the acquired image, the frequency band of radio waves used for communication between the communication device and the communication partner.

According to an aspect of the present invention, the frequency band determination section determines the frequency band depending on whether or not the communication device and the communication partner are in the same room.

Alternatively, the frequency band determination section may determine the frequency band depending on whether the acquired image includes an image of the communication device or an image of the communication partner.

Still alternatively, the frequency band determination section determines the frequency band in accordance with the distance between the communication device and the communication partner, which is identifiable from the acquired image.

In this aspect, if the distance is greater than a first threshold value, the frequency band determination section may change the frequency band from a first frequency band to a second frequency band; if the distance is smaller than a second threshold value, the frequency band determination section may change the frequency band from the second frequency band to the first frequency band; the first threshold value may be greater than the second threshold value; the first frequency band may be higher than the second frequency band; and the difference between the second threshold value and the first threshold value may be based on the distance.

A head-mounted display according to the present invention includes an image acquisition section and a frequency band determination section. The image acquisition section acquires an image of an environment in which at least either the head-mounted display or a communication partner for the head-mounted display is placed. The frequency band determination section determines, based on the acquired image, the frequency band of radio waves used for communication between the head-mounted display and the communication partner.

A frequency band determination method according to the present invention includes the steps of: acquiring an image of an environment in which at least either a communication device or a communication partner for the communication device is placed; and determining, based on the acquired image, the frequency band of radio waves used for communication between the communication device and the communication partner.

A program according to the present invention causes a computer to execute procedures for: acquiring an image of an environment in which at least either a communication device or a communication partner for the communication device is placed; and determining, based on the acquired image, the frequency band of radio waves used for communication between the communication device and the communication partner.

BRIEF DESCRIPTION OF DRAWINGS

FIG. 3B is a schematic diagram illustrating an example in which the video display system according to the present embodiment is disposed in a room.

DESCRIPTION OF EMBODIMENT

An embodiment of the present invention will now be described with reference to the accompanying drawings.

Figure 1:
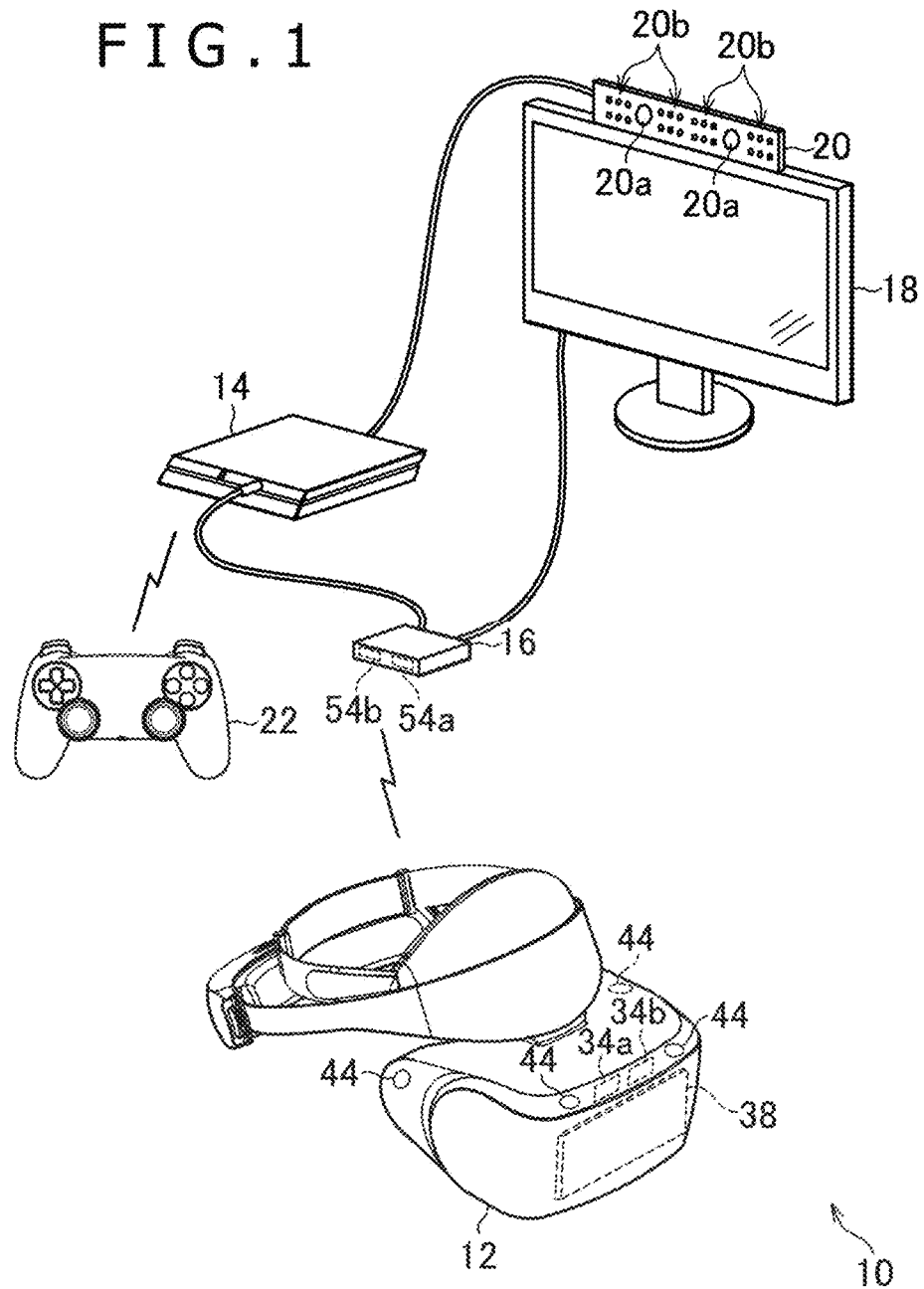
FIG. 1 is a diagram illustrating an exemplary overall configuration of a video display system according to an embodiment of the present invention.
Figure 2A:
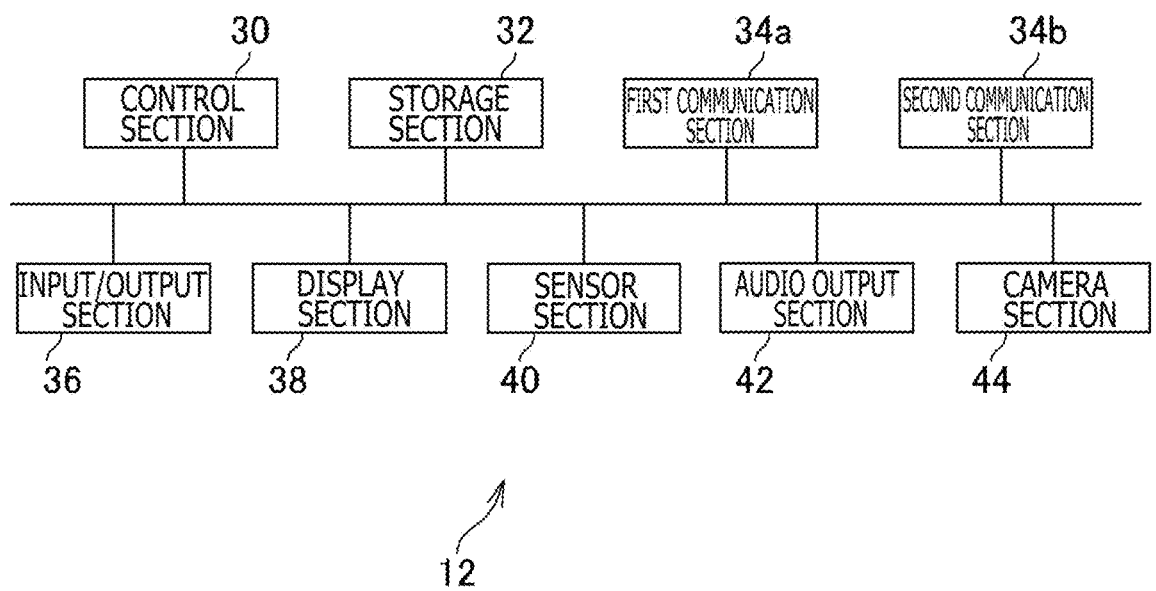
FIG. 2A is a diagram illustrating an exemplary configuration of a head-mounted display according to an embodiment of the present invention.
Figure 2B:
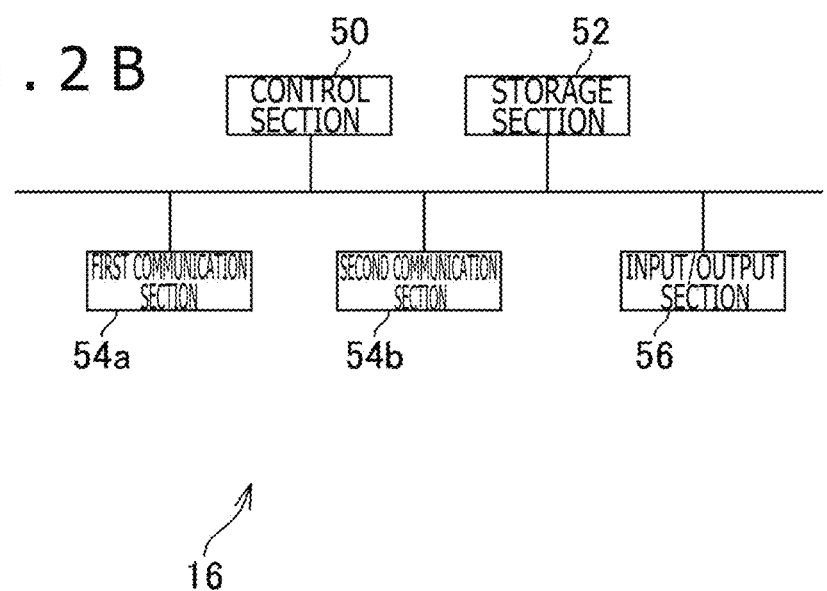
FIG. 2B is a diagram illustrating an exemplary configuration of a relay device according to an embodiment of the present invention.

FIG. 1 is a diagram illustrating an exemplary overall configuration of a video display system 10 according to an embodiment of the present invention. FIG. 2A is a diagram illustrating an exemplary configuration of a head-mounted display (HMD) 12 according to the present embodiment. FIG. 2B is a diagram illustrating an exemplary configuration of a relay device 16 according to the present embodiment.

As illustrated in FIG. 1, the video display system 10 according to the present invention includes the HMD 12, an entertainment device 14, the relay device 16, a display 18, a camera/microphone unit 20, and a controller 22.

As illustrated, for example, in FIG. 2A, the HMD 12 according to the present embodiment includes a control section 30, a storage section 32, two communication sections 34 (first communication section 34a and second communication section 34b), an input/output section 36, a display section 38, a sensor section 40, an audio output section 42, and a camera section 44.

The control section 30 is formed of a microprocessor or other program control device that operates in accordance, for example, with a program installed on the HMD 12.

The storage section 32 is formed of a storage element such as a read-only memory (ROM) or a random access memory (RAM). The storage section 32 stores, for example, a program that is to be executed by the control section 30.

The first communication section 34a and the second communication section 34b are each formed of a wireless local area network (LAN) module or other communication interface having a built-in array antenna. As illustrated in FIG. 1, the present embodiment is configured so that the first communication section 34a and the second communication section 34b are disposed on the upper front of the HMD 12.

In the present embodiment, the communication standard for communication established by the first communication section 34a is different from the communication standard for communication established by the second communication section 34b. For example, the first communication section 34a establishes 60 GHz band communication, whereas the second communication section 34b establishes 5 GHz band communication.

The 60 GHz band communication provides communication at a higher maximum rate than the 5 GHz band communication. Further, the 60 GHz band communication provides higher linearity and a shorter communication range than the 5 GHz band communication. In the present embodiment, either the first communication section 34a or the second communication section 34b can be selectively used to communicate with the relay device 16 in accordance with radio wave conditions for wireless communication. Further, a well-known adaptive modulation/coding technology can be used in the present embodiment to adaptively change the modulation method and coding method of the first and second communication sections 34a and 34b in accordance with the radio wave conditions for wireless communication.

The input/output section 36 is formed of an input/output port such as an HDMI (registered trademark) (High-Definition Multimedia Interface) port, a universal serial bus (USB) port, or an auxiliary (AUX) port.

The display section 38 is formed of a liquid-crystal display, an organic electroluminescence (EL) display, or other display disposed on the front of the HMD 12, and used to display, for example, video generated by the entertainment device 14. The display section 38 is accommodated in a housing of the HMD 12. The display section 38 may receive, for example, a video signal outputted from the entertainment device 14 and relayed by the relay device 16, and output video represented by the received video signal. The display section 38 according to the present embodiment is capable of displaying a three-dimensional image, for example, by displaying a left-eye image and a right-eye image. The display section 38 may be capable of displaying only a two-dimensional image and incapable of displaying a three-dimensional image.

The sensor section 40 is formed of a sensor such as an acceleration sensor or a motion sensor. The sensor section 40 outputs the results of measurements, such as a rotation amount and movement amount of the HMD 12, to the control section 30 at a predetermined frame rate.

The audio output section 42 is formed, for example, of a headphone or a speaker, and used to output, for example, a sound that is represented by audio data generated by the entertainment device 14. The audio output section 42 receives, for example, an audio signal outputted from the entertainment device 14 and relayed by the relay device 16, and outputs a sound represented by the received audio signal.

The camera section 44 is formed of a digital camera or other camera and used to capture, at a predetermined frame rate, an image of surroundings of a user wearing the HMD 12. As illustrated in FIG. 1, the camera section according to the present embodiment includes, for example, four cameras. As depicted, for example, in FIG. 1, the four cameras are individually disposed on the upper left of the display section 38, the upper right of the display section 38, the left side surface of the housing for the HMD 12, and the right side surface of the housing for the HMD 12. The cameras may incorporate, for example, a fisheye lens to capture an omnidirectional image of the surroundings of the HMD 12 or may be capable of capturing only a directional image. Further, the camera section 44 may include an infrared camera that is disposed inside the housing for the HMD 12 to detect the line-of-sight direction of the user wearing the HMD 12.

Furthermore, the camera section 44 may be capable of identifying the distance between the HMD 12 and the relay device 16. For example, the cameras disposed on the upper left and upper right of the display section 38 may be configured as a stereo camera. Moreover, the distance between the HMD 12 and the relay device 16 may be identifiable based on an image captured by the stereo camera. In addition, the camera section 44 may include an infrared camera or other device (distance measuring device) capable of measuring the distance between the HMD 12 and the relay device 16, which is disposed forward of the HMD 12.

The entertainment device 14 according to the present embodiment is formed of a computer such as a game console, a digital versatile disc (DVD) player, or a Blu-ray (registered trademark) player. The entertainment device 14 according to the present embodiment generates video and audio, for example, by executing a stored game program or reproducing content recorded on an optical disk. The entertainment device 14 according to the present embodiment outputs a video signal representative of the generated video and an audio signal representative of the generated audio to the HMD 12 and the display 18 through the relay device 16.

The relay device 16 according to the present embodiment is formed of a computer that relays the video and audio signals outputted from the entertainment device 14 and outputs them to the HMD 12 and the display 18.

As illustrated, for example, in FIG. 2B, the relay device 16 according to the present embodiment includes a control section 50, a storage section 52, two communication sections 54 (first communication section 54a and second communication section 54b), and an input/output section 56.

The control section 50 is formed, for example, of a control circuit or a central processing unit (CPU) or other program control device that operates in accordance with a program installed on the relay device 16.

The storage section 52 is formed, for example, a ROM, a RAM, or other storage element. The storage section 52 stores, for example, a program to be executed by the control section 50.

The first communication section 54a and the second communication section 54b are each formed of a wireless LAN module or other communication interface having a built-in array antenna. As illustrated in FIG. 1, the present embodiment is configured so that the first communication section 54a and the second communication section 54b are included in the front of the relay device 16.

In the present embodiment, the communication standard for communication established by the first communication section 54a is different from the communication standard for communication established by the second communication section 54b. For example, the first communication section 54a establishes 60 GHz band communication, whereas the second communication section 54b establishes 5 GHz band communication.

As mentioned earlier, the 60 GHz band communication provides communication at a higher maximum rate than the 5 GHz band communication. Further, the 60 GHz band communication provides higher linearity and a shorter communication range than the 5 GHz band communication. In the present embodiment, either the first communication section 34a or the second communication section 34b can be selectively used to communicate with the HMD 12 in accordance with the radio wave conditions for wireless communication.

The input/output section 56 is formed of an input/output port such as an HDMI (registered trademark) (High-Definition Multimedia Interface) port or a USB port.

The display 18 according to the present embodiment is formed, for example, of a liquid-crystal display, and used to display, for example, video represented by a video signal outputted from the entertainment device 14.

The camera/microphone unit 20 according to the present embodiment includes a camera 20a and a microphone 20b. The camera 20a captures an image, for example, of a subject and outputs the captured image to the entertainment device 14. The microphone 20b captures an ambient sound, converts the captured sound to audio data, and outputs the audio data to the entertainment device 14. Further, the camera 20a according to the present embodiment is a stereo camera.

The HMD 12 and the relay device 16 are capable of establishing, for example, wireless communication to send and receive data to and from each other. When the HMD 12 and the relay device 16 communicate with each other in the present embodiment, 60 GHz band communication is established between the first communication section 34a and the first communication section 54a, and 5 GHz band communication is established between the second communication section 34b and the second communication section 54b.

The entertainment device 14 is connected to the relay device 16, for example, with an HDMI cable or a USB cable. The relay device 16 is connected to the display 18, for example, with an HDMI cable. The entertainment device 14 is connected to the camera/microphone unit 20, for example, with an AUX cable.

The controller 22 according to the present embodiment is an operation input device that is used to make an operation input to the entertainment device 14. The user can use the controller 22 to perform various operation input procedures by pressing a direction key or a button on the controller 22 or tilting an operating stick on the controller 22. Then, in the present embodiment, the controller 22 outputs to the entertainment device 14 input data associated with the operation input. Further, the controller 22 according to the present embodiment includes a USB port. When connected to the entertainment device 14 with a USB cable, the controller 22 is capable of outputting input data to the entertainment device 14 in a wired manner. The controller 22 according to the present embodiment additionally includes, for example, a wireless communication module, and is thus capable of wirelessly outputting input data to the entertainment device 14.

Figure 3A:
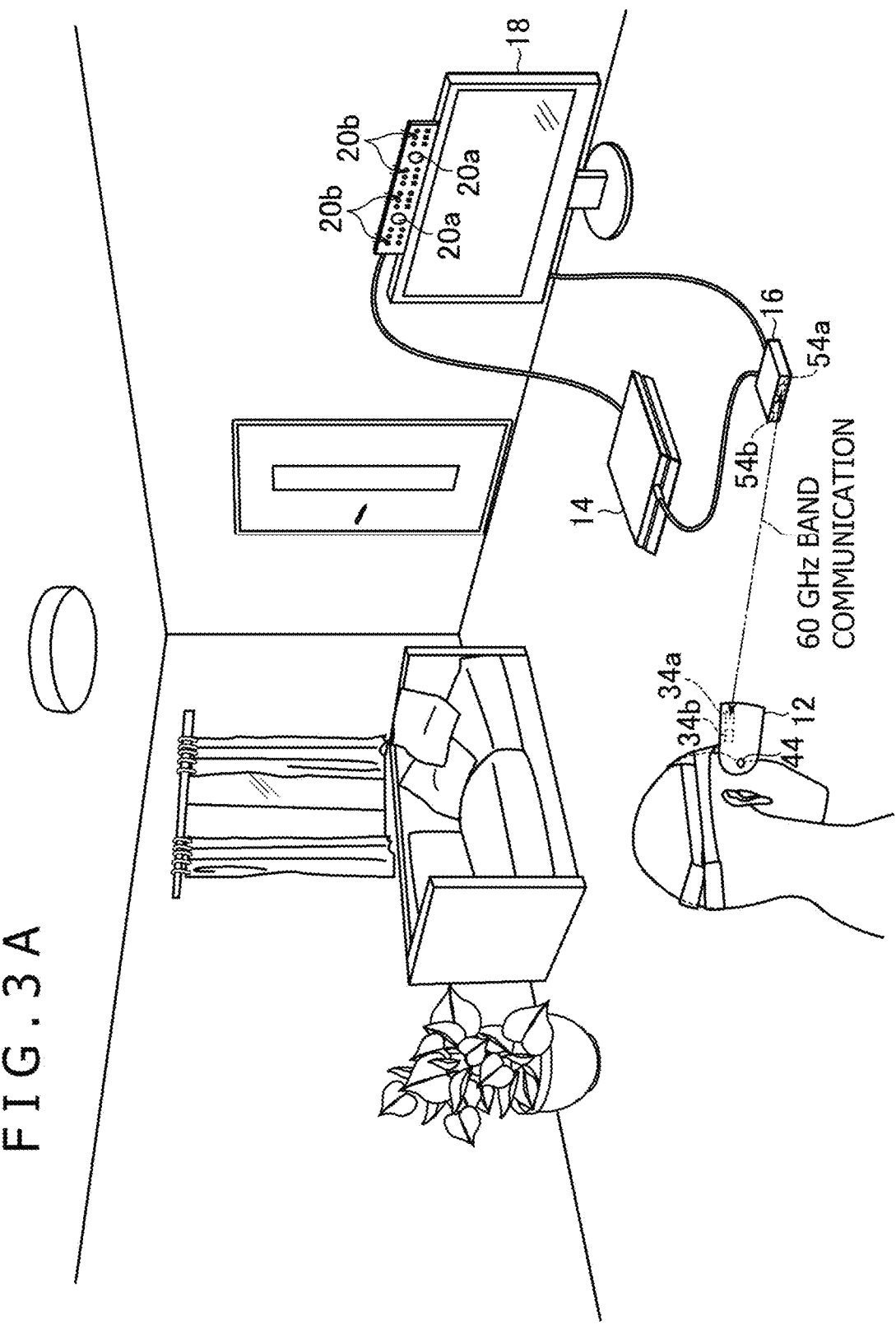
FIG. 3A is a schematic diagram illustrating an example in which the video display system according to the present embodiment is disposed in a room.

FIGS. 3A and 3B are schematic diagrams illustrating examples in which the video display system 10 according to the present embodiment is disposed in a room. In the present embodiment, the first communication section 34a of the HMD 12 establishes 60 GHz band communication with the first communication section 54a of the relay device 16 when the HMD 12 and the relay device 16 are in the same room as illustrated in FIG. 3A. Meanwhile, when the HMD 12 and the relay device 16 are in different rooms as illustrated in FIG. 3B, the second communication section 34b of the HMD 12 establishes 5 GHz band communication with the second communication section 54b of the relay device 16.

Based on an image that is captured by the camera section 44 to depict an environment in which at least either the HMD 12 or the relay device 16 is placed, the present embodiment determines whether the HMD 12 and the relay device 16 are in the same room or in different rooms. If, for example, an image of the relay device 16 is included in the image captured by the camera section 44, it is determined that the HMD 12 and the relay device 16 are in the same room. If, by contrast, the image of the relay device 16 is not included in the image captured by the camera section 44, it is determined that the HMD 12 and the relay device 16 are in different rooms.

If it is determined that the HMD 12 and the relay device 16 are in the same room, the present embodiment exercises control so as to establish 60 GHz band communication between the HMD 12 and the relay device 16. If, by contrast, it is determined that the HMD 12 and the relay device 16 are in different rooms, the present embodiment exercises control so as to establish 5 GHz band communication between the HMD 12 and the relay device 16.

As described above, based on the positional relationship between the HMD 12 and the relay device 16, which is identified from an image captured by the camera section 44, the present embodiment determines the frequency band of radio waves used for communication.

When the HMD 12 and the relay device 16 are in different rooms, there is a wall, a door, or other obstacle between the HMD 12 and the relay device 16. Therefore, it is highly probable that 60 GHz or other high-frequency band communication is low in quality. Consequently, when it is determined based on an image captured by the camera section 44 that the HMD 12 and the relay device 16 are in different rooms, the present embodiment exercises control so as to establish 5 GHz or other low-frequency band communication between the HMD 12 and the relay device 16. Let us assume, for example, that the user wearing the HMD 12 moves from a room in which the relay device 16 is disposed to another room while 60 GHz band communication is established between the HMD 12 and the relay device 16. In this instance, the communication between the HMD 12 and the relay device 16 switches to 5 GHz band communication. In this manner, the present embodiment changes the frequency band of radio waves used for communication in accordance with a change in the environment in which the HMD 12 and the relay device 16 are placed, and this change occurs earlier than a frequency band change after communication quality confirmation.

Further, millimeter waves are advantageous in that, for example, the maximum rate available for communication is high. Therefore, if the communication quality provided by the millimeter waves is achievable during microwave communication, it is preferable that microwave communication be replaced by millimeter-wave communication. Let us assume here that while 5 GHz band communication is established between the HMD 12 and the relay device 16, a user wearing the HMD 12 moves from a room to another room in which the relay device 16 is disposed. In this instance, the communication between the HMD 12 and the relay device 16 switches to 60 GHz band communication. In this manner, the present embodiment switches to high-frequency band communication in accordance with an environmental change that improves the quality of high-frequency band communication.

Meanwhile, whether an obstacle exists between the HMD 12 and the relay device 16 to block radio waves may be determined based on an image captured by the camera section 44. If it is determined that an obstacle exists between the HMD 12 and the relay device 16 to block radio waves, control may be exercised so as to establish 5 GHz band communication between the HMD 12 and the relay device 16. If, by contrast, it is determined that no obstacle exists between the HMD 12 and the relay device 16 to block radio waves, control may be exercised so as to establish 60 GHz band communication between the HMD 12 and the relay device 16.

Further, even if the HMD 12 and the relay device 16 are in the same room, the frequency band of radio waves used for communication may be determined depending on whether an image of the relay device 16 is included in an image captured by the camera section 44. If, for example, the image of the relay device 16 is included in the image captured by the camera section 44, control may be exercised so as to establish 60 GHz band communication between the HMD 12 and the relay device 16. Meanwhile, if, for example, the image of the relay device 16 is not included in the image captured by the camera section 44, control may be exercised so as to establish 5 GHz band communication between the HMD 12 and the relay device 16.

Moreover, whether 5 GHz or 60 GHz band communication is to be established between the HMD 12 and the relay device 16 may be determined in accordance, for example, with the distance between the HMD 12 and the relay device 16. In such an instance, the distance between the HMD 12 and the relay device 16 may be identified by the stereo camera included in the camera section 44. If the HMD 12 includes a distance measuring device, the distance measuring device may identify the distance between the HMD 12 and the relay device 16.

Functions of the HMD 12 according to the present embodiment and a process performed by the HMD 12 will be further described below. The HMD 12 according to the present embodiment functions as a frequency band determination device that determines the frequency band of radio waves used for communication between the HMD 12 and the relay device 16 in accordance with an environment in which at least either the HMD 12 or the relay device 16 is placed.

Figure 4:
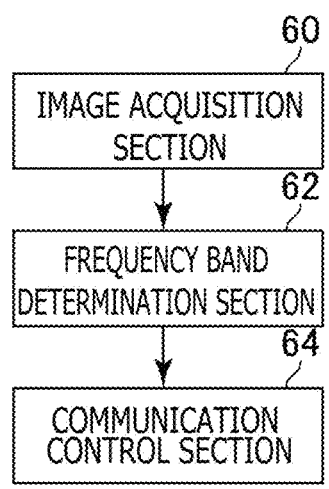
FIG. 4 is a functional block diagram illustrating examples of functions implemented in the head-mounted display according to an embodiment of the present invention.

FIG. 4 is a functional block diagram illustrating examples of functions implemented in the HMD 12 according to the present embodiment. The HMD 12 according to the present embodiment need not incorporate all the functions illustrated in FIG. 4, and may incorporate functions other than those illustrated in FIG. 4.

As illustrated in FIG. 4, the HMD 12 according to the present embodiment functionally includes an image acquisition section 60, a frequency band determination section 62, and a communication control section 64. The image acquisition section 60 is mainly implemented by the control section 30 and the camera section 44. The frequency band determination section 62 is mainly implemented by the control section 30. The communication control section 64 is mainly implemented by the control section 30, the first communication section 34a, and the second communication section 34b.

The above functions may be implemented by allowing the control section 30 to execute a program that is installed on the HMD 12 formed of a computer and includes commands for the above functions. The program is supplied to the HMD 12, for example, through an optical disk, a magnetic disk, a magnetic tape, a magneto-optical disk, a flash memory, or other computer-readable information storage medium or through the Internet or the like.

In the present embodiment, the image acquisition section 60 acquires an image of an environment in which, for example, at least either a communication device (the HMD 12 in the current example) or a communication partner for the communication device (the relay device 16 in the current example) is placed. The image acquisition section 60 acquires an image captured by the camera section 44.

In the present embodiment, based, for example, on an image acquired by the image acquisition section 60, the frequency band determination section 62 determines the frequency band of radio waves used for communication between the communication device (the HMD 12 in the current example) and the communication partner (the relay device 16 in the current example). Here, as described earlier, depending on whether the HMD 12 and the relay device 16 are in the same room, the frequency band determination section 62 may determine the frequency band of radio waves used for communication between the communication device the HMD 12 and the relay device 16. Further, based on the distance between the HMD 12 and the relay device 16, the frequency band determination section 62 may determine the frequency band of radio waves used for communication between the communication device the HMD 12 and the relay device 16. Furthermore, depending on whether an image of the HMD 12 or an image of the relay device 16 is included in the image captured by the image acquisition section 60, the frequency band determination section 62 may determine the frequency band of radio waves used for communication between the communication device the HMD 12 and the relay device 16. Here, even when the HMD 12 and the relay device 16 are in the same room, the frequency band determination section 62 may determine the frequency band of radio waves used for the communication depending on whether the image of the relay device 16 is included in the image captured by the image acquisition section 60. Moreover, the frequency band determination section 62 may determine the frequency band of radio waves used for the communication depending on whether the image of the HMD 12 is included, for example, in the image captured by the image acquisition section 60.

In the present embodiment, the communication control section 64 exercises control so as to establish communication by using the frequency band determined, for example, by the frequency band determination section 62. If, for example, it is determined that 60 GHz band communication is to be established, the communication control section 64 exercises control so as to let the first communication section 34a establish communication. If, for example, it is determined that 5 GHz band communication is to be established, the communication control section 64 exercises control so as to let the second communication section 34b establish communication.

Further, in the present embodiment, the communication control section 64 retains communication section identification data. The communication section identification data is used to manage whether established communication is provided by the first communication section 34a or the second communication section 34b. If, for example, the established communication is provided by the first communication section 34a, the value of the communication section identification data is set to "1." If, by contrast, the established communication is provided by the second communication section 34b, the value of the communication section identification data is set to "2." When the value of the communication section identification data is set to "1," the communication control section 64 may exercise control so as to stop the second communication section 34b. Meanwhile, when the value of the communication section identification data is set to "2," the communication control section 64 may exercise control so as to stop the first communication section 34a.

Figure 5:
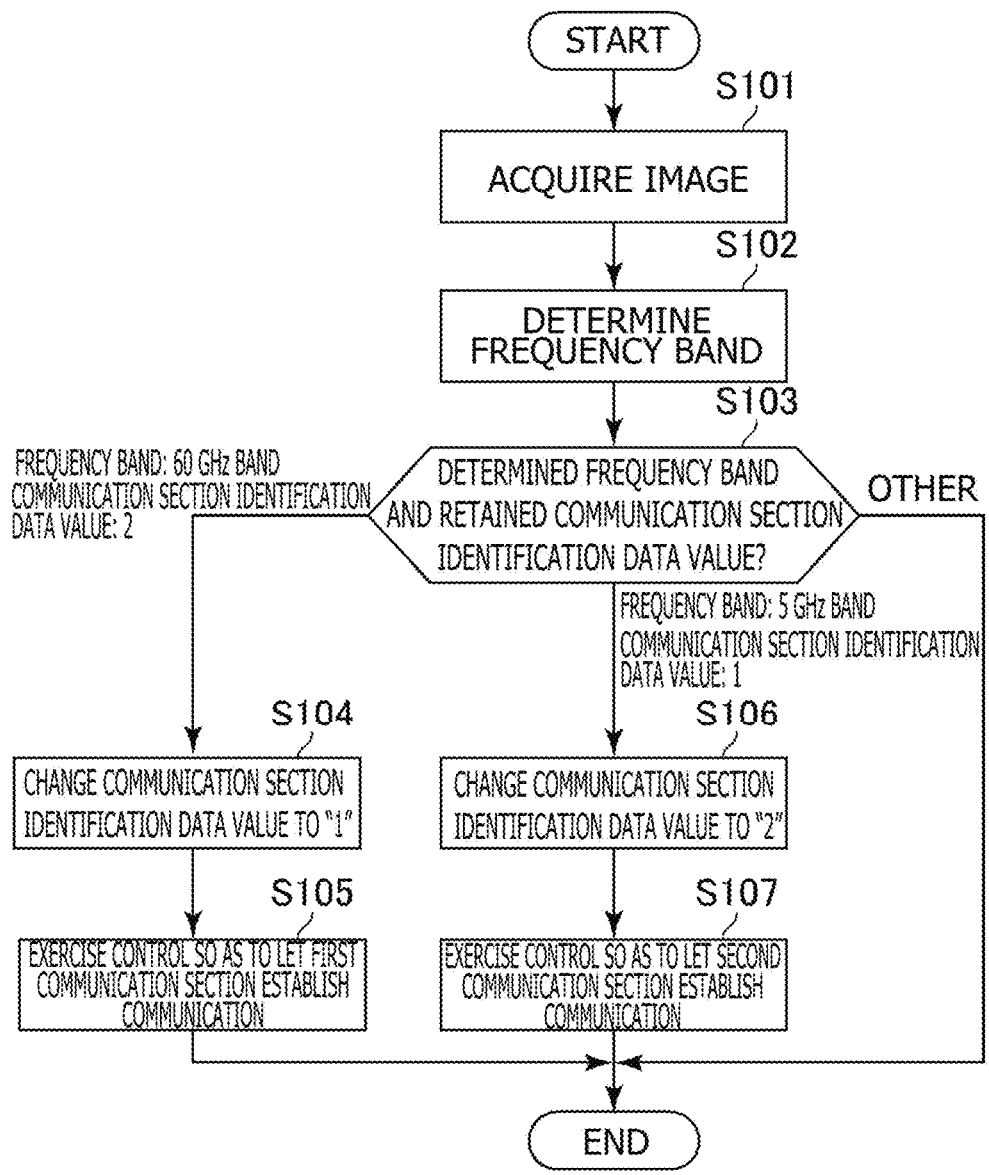
FIG. 5 is a flowchart illustrating exemplary processing steps performed by the head-mounted display according to an embodiment of the present invention.

The following describes, with reference to the flowchart of FIG. 5, exemplary processing steps that are performed by the HMD 12 according to the present embodiment when the frequency band is to be determined depending on whether the HMD 12 and the relay device 16 are in the same room.

First of all, the image acquisition section 60 acquires an image captured by the camera section 44 (step S101). When the camera section 44 is capturing an image at a predetermined frame rate, for example, the latest image captured by the camera section 44 may be acquired in step S101.

Then, based on the image acquired in step S101, the frequency band determination section 62 determines the frequency band of radio waves used for communication (step S102). Here, based, for example, on the image captured by the camera section 44, the frequency band determination section 62 identifies whether the HMD 12 and the relay device 16 are in the same room. If it is identified that the HMD 12 and the relay device 16 are in the same room, the frequency band determination section 62 determines that the frequency band of radio waves used for communication is the 60 GHz band. If, by contrast, it is identified that the HMD 12 and the relay device 16 are in different rooms, the frequency band determination section 62 determines that the frequency band of radio waves used for communication is the 5 GHz band. If an image of the relay device 16 is included in the image captured by the camera section 44, the frequency band determination section 62 may determine that the HMD 12 and the relay device 16 are in the same room. Meanwhile, if an image of the relay device 16 is not included in the image captured by the camera section 44, the frequency band determination section 62 may determine that the HMD 12 and the relay device 16 are in different rooms.

Next, the communication control section 64 verifies the frequency band determined in step S102 and the value of the retained communication section identification data (step S103).

If the frequency band determined in step S102 is the 60 GHz band, and the value of the communication section identification data verified in step S103 is "2," the communication control section 64 changes the value of the communication section identification data to "1" (step S104). The communication control section 64 then exercises control so as to let the first communication section 34a establish communication (step S105). The process illustrated in the current example then terminates. In step S105, the communication control section 64 may start the first communication section 34a and stop the second communication section 34b.

If the frequency band determined in step S102 is the 5 GHz band, and the value of the communication section identification data verified in step S103 is "1," the communication control section 64 changes the value of the communication section identification data to "2" (step S106). The communication control section 64 then exercises control so as to let the second communication section 34b establish communication (step S107). The process illustrated in the current example then terminates. In step S107, the communication control section 64 may start the second communication section 34b and stop the first communication section 34a.

In the other cases, the process illustrated in the current example terminates. More specifically, if the frequency band determined in step S102 is the 60 GHz band, and the value of the communication section identification data verified in step S103 is "1," the process illustrated in the current example terminates. Further, if the frequency band determined in step S102 is the 5 GHz band, and the value of the communication section identification data verified in step S103 is "2," the process illustrated in the current example also terminates.

Processing then returns to step S101. Subsequently, steps S101 to S105 are repeated. Steps S101 to S105 may be performed at predetermined time intervals.

Further, as described earlier, in step S102, the frequency band determination section 62 may identify, based on the image captured by the camera section 44, whether an obstacle exists between the HMD 12 and the relay device 16 to block radio waves. If it is identified that an obstacle exists to block radio waves, the frequency band determination section 62 may determine that the frequency band of radio waves used for communication is the 5 GHz band. Meanwhile, if it is identified that no obstacle exists to block radio waves, the frequency band determination section 62 may determine that the frequency band of radio waves used for communication is the 60 GHz band.

Moreover, in step S102, the frequency band determination section 62 may determine the frequency band of radio waves used for communication in accordance with the distance between the HMD 12 and the relay device 16.

Figure 6:
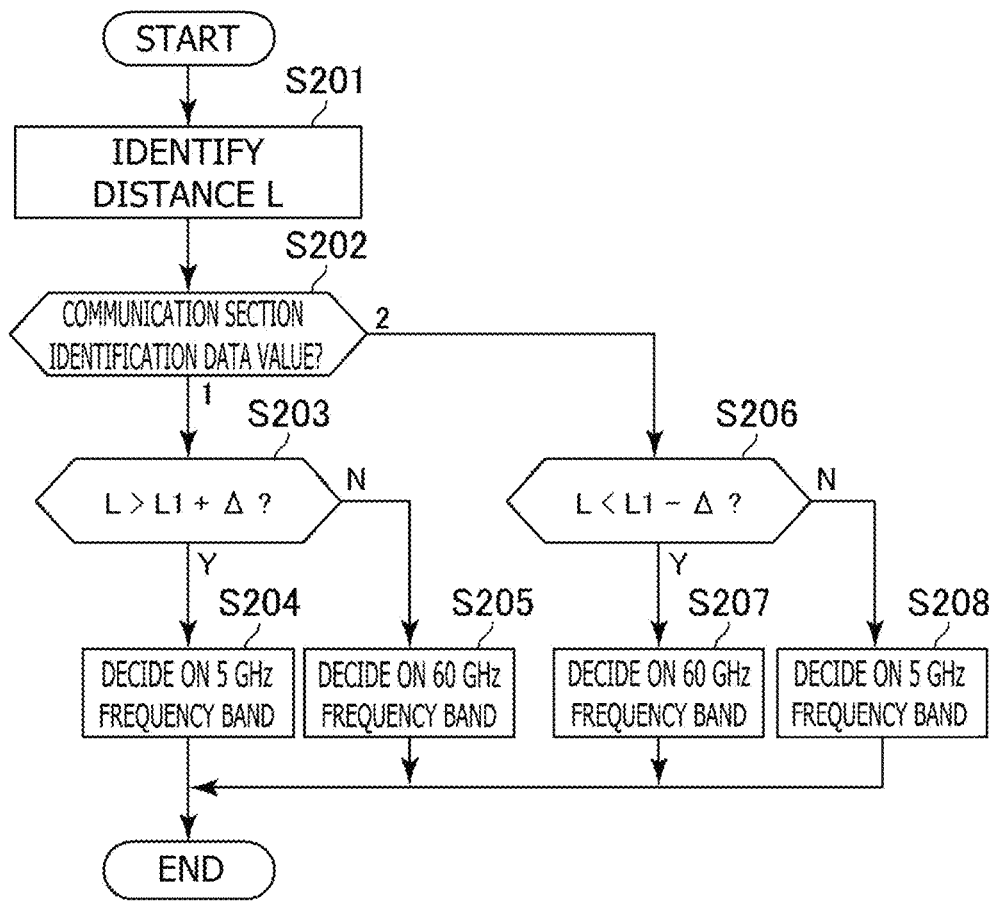
FIG. 6 is a flowchart illustrating exemplary processing steps performed by the head-mounted display according to an embodiment of the present invention.

The following describes, with reference to the flowchart of FIG. 6, exemplary processing steps that correspond to the above-described step S102 and are performed by the frequency band determination section 62 when the frequency band of radio waves used for communication is to be determined based on the distance between the HMD 12 and the relay device 16.

First of all, based on the image acquired in step S101, the frequency band determination section 62 identifies the distance L between the HMD 12 and the relay device 16 (step S201). Next, the frequency band determination section 62 verifies the value of the communication section identification data retained by the communication control section 64 (step S202).

If it is verified in step S202 that the value of the communication section identification data is "1," the frequency band determination section 62 verifies whether the distance L identified in step S201 is greater than a first threshold value (L1+Δ) which is obtained by adding the value Δ to a reference distance L1 (step S203). Here, the reference distance L1 is, for example, 8 m, and the value Δ is a value based on the distance L identified in step S201, for example, 0.1×L. The value Δ may be a value according to image-based recognition accuracy at distance L.

If it is verified in step S203 that the distance L identified in step S201 is greater than the first threshold value (L1+Δ) ("Y" at step S203), the frequency band determination section 62 determines that the frequency band of radio waves used for communication is the 5 GHz band (step S204). Subsequently, steps S103 and beyond are performed. Meanwhile, if it is verified that the distance L identified in step S201 is not greater than the first threshold value (L1+Δ) ("N" at step S203), the frequency band determination section 62 determines that the frequency band of radio waves used for communication is the 60 GHz band (step S205). Subsequently, steps S103 and beyond are performed.

If it is verified in step S202 that the value of the communication section identification data is "2," the frequency band determination section 62 verifies whether the distance L identified in step S201 is smaller than a second threshold value (L1−Δ) which is obtained by subtracting the value Δ from the reference distance L1 (step S206).

If it is verified in step S206 that the distance L identified in step S201 is smaller than the second threshold value (L1−Δ), the frequency band determination section 62 determines that the frequency band of radio waves used for communication is the 60 GHz band (step S207). Subsequently, steps S103 and beyond are performed. Meanwhile, if it is verified that the distance L identified in step S201 is not smaller than the second threshold value (L1−Δ), the frequency band determination section 62 determines that the frequency band of radio waves used for communication is the 5 GHz band (step S208). Subsequently, steps S103 and beyond are performed.

In a situation where the above-described scheme is applied, if the distance L is greater than the first threshold value (L1+Δ), the frequency band determination section 62 changes the frequency band of radio waves used for communication between the HMD 12 and the relay device 16 from a first frequency band (e.g., 60 GHz band) to a second frequency band (5 GHz band). Meanwhile, if the distance L is smaller than the second threshold value (L1−Δ), the frequency band determination section 62 changes the frequency band of radio waves used for communication between the HMD 12 and the relay device 16 from the second frequency band (e.g., 5 GHz band) to the first frequency band (60 GHz band).

As described above, the threshold value of the distance between the HMD 12 and the relay device 16 may vary depending on whether the frequency band of radio waves used for communication changes from the first frequency band (high-frequency band) to the second frequency band (low-frequency band) or changes from the low-frequency band to the high-frequency band. Further, the difference (2×Δ) between the first threshold value (L1+Δ) and the second threshold value (L1−Δ) may be based on the distance L identified in step S201.

The present invention is not limited to the above-described embodiment.

For example, all or some of the functions illustrated in FIG. 4 may be implemented by the relay device 16 or the entertainment device 14. In such an instance, control is exercised to determine whether the relay device 16 uses the first communication section 54a or the second communication section 54b to communicate with the HMD 12.

Further, the frequency band of radio waves used for communication between the HMD 12 and the relay device 16 may be determined based on an image that is captured by the camera 20a to depict an environment in which at least either the HMD 12 or the relay device 16 is placed. Here, the frequency band of radio waves for communication between the HMD 12 and the relay device 16 may be determined depending, for example, on whether an image of the HMD 12 is included in the image captured by the camera 20a. If, for example, the image of the HMD 12 is included in the image captured by the camera section 20a, control may be exercised to establish 60 GHz band communication between the HMD 12 and the relay device 16. Meanwhile, if, for example, the image of the HMD 12 is not included in the image captured by the camera section 20a, control may be exercised to establish 5 GHz band communication between the HMD 12 and the relay device 16.

Furthermore, the present invention is not only applicable to switching between 60 GHz band communication and 5 GHz band communication, but is generally applicable to switching between high-frequency band communication and low-frequency band communication.

Moreover, the foregoing specific character strings and numerical values and the character strings and numerical values in the accompanying drawings are illustrated and not restrictive.

The invention claimed is:

1. A head-mounted display comprising:
   an information acquisition section that continuously acquires information of an environment in which at least one of a communication device and a communication partner for the communication device is placed; and
   at least one camera which captures images of a physical environment in which a user wearing the head-mounted display is located, wherein:
   the communication partner receives video and audio signals from an entertainment device and outputs the video and audio signals to the communication device,
   the information acquisition section continuously acquires the information at a predetermined frame rate,
   the communication partner is connected to the entertainment device with wired communication, and
   the communication partner is connected to the communication device with wireless communication using a communication standard selected from a plurality of communication standards based at least in part on images of the physical environment captured by the at least one camera.

2. The head-mounted display of claim 1, wherein the at least one camera includes one or more cameras among a plurality of cameras.

3. The head-mounted display of claim 2, wherein one or more of the plurality of cameras are disposed on the head-mounted display and one or more cameras are disposed in other positions within the physical environment.

4. The head-mounted display of claim 1, wherein the at least one camera captures one of: (i) an omnidirectional image of surroundings of the physical environment, and (ii) a directional image.

5. The head-mounted display of claim 1, wherein the at least one camera operates as a distance measuring device operating to facilitate distance measurements between the head-mounted display and other objects within the physical environment.

6. The head-mounted display of claim 1, wherein the at least one camera includes an infrared camera operating to detect a line-of-sight direction of the user wearing the head-mounted display.

7. The head-mounted display of claim 1, wherein the communication partner is a relay device operating to relay the video and audio signals outputted from the entertainment device to the communication device.

8. The head-mounted display of claim 7, wherein the relay device operates in accordance with a wireless local area network (LAN).

9. The head-mounted display of claim 1, further comprising a frequency band determination section that, upon the acquisition of each information, determines the communication standard from among a plurality of communication standards of frequency bands of radio waves.

10. The head-mounted display of claim 1, wherein the communication device is part of the head-mounted display.

11. The head-mounted display of claim 1, wherein the entertainment device includes a processing section that executes an interactive application that is manipulated in part through receiving inputs from the user of the head-mounted display.

12. A system, comprising: a head-mounted display adapted to be worn by a user for engaging in an interactive experience; an entertainment device including a processing section that executes an interactive application that is manipulated in part through receiving inputs from the user; and a communication partner operating to relay video and audio signals outputted from the entertainment device to the head-mounted display, wherein the head-mounted display includes: (1) an information acquisition section that continuously acquires information of an environment in which the communication partner is located; and (11) at least one camera which captures images of a physical environment in which the user wearing the head-mounted display is located, wherein: the information acquisition section continuously acquires the information at a predetermined frame rate, the communication partner is connected to the entertainment device with wired communication, and the communication partner is connected to the head-mounted display with wireless communication using a communication standard selected from a plurality of communication standards based at least in part on images of the physical environment captured by the at least one camera.

13. A method, comprising: providing a head-mounted display to be worm by a user located within a physical environment and for engaging in an interactive experience; providing an entertainment device including a processing section that executes an interactive application that is manipulated in part through receiving inputs from the user; providing a communication partner operating to relay video and audio signals outputted from the entertainment device to the head-mounted display; continuously acquiring information of the environment at a predetermined frame rate; and providing at least one camera on the head-mounted display, which captures images of the physical environment, wherein:
   the communication partner is connected to the entertainment device with wired communication, and the communication partner is connected to the head-mounted display with wireless communication using a communication standard selected from a plurality of communication standards based at least in part on images of the physical environment captured by the at least one camera.

14. At least one non-transitory, computer readable storage medium containing at least one computer program, which when executed by one or more computer processors, causes the one or more processors to perform a method by carrying out actions, comprising: providing a head-mounted display to be worm by a user located within a physical environment and for engaging in an interactive experience; providing an entertainment device including a processing section that executes an interactive application that is manipulated in part through receiving inputs from the user; providing a communication partner operating to relay video and audio signals outputted from the entertainment device to the head-mounted display; continuously acquiring information of the environment at a predetermined frame rate; and providing at least one camera on the head-mounted display, which captures images of the physical environment, wherein: the communication partner is connected to the entertainment device with wired communication, and the communication partner is connected to the head-mounted display with wireless communication using a communication standard selected from a plurality of communication standards based at least in part on images of the physical environment captured by the at least one camera.

* * * * *